United States Patent [19]

Seighman

[11] Patent Number: 4,713,251

[45] Date of Patent: Dec. 15, 1987

[54] PROCESS FOR ENCAPSULATING LIQUID ACIDS AND PRODUCT

[75] Inventor: Jon T. Seighman, North Olmsted, Ohio

[73] Assignee: Durkee Industrial Foods Corp., Iselin, N.J.

[21] Appl. No.: 810,662

[22] Filed: Dec. 18, 1985

[51] Int. Cl.$^4$ .............................................. A23L 1/216
[52] U.S. Cl. ...................................... 426/96; 426/97; 426/650
[58] Field of Search ............................ 426/650, 96–97

[56] References Cited

U.S. PATENT DOCUMENTS

| | | | |
|---|---|---|---|
| 1,686,703 | 10/1928 | Leo | 426/650 |
| 2,424,992 | 8/1947 | Lee | 426/650 X |
| 2,438,326 | 3/1948 | Schopmeyer | 426/650 |
| 3,445,244 | 5/1969 | Noznick et al. | 426/650 X |
| 4,022,924 | 5/1977 | Mitchell et al. | 426/650 |
| 4,285,983 | 8/1981 | Saldarini et al. | 426/650 X |

Primary Examiner—Joseph Golian
Attorney, Agent, or Firm—Richard H. Thomas

[57] ABSTRACT

A process for encapsulating liquid acids such as phosphoric acid, comprising the steps of; preparing a water dispersion of said acid, a water dispersible matrix forming ingredient and an acid buffering agent; and forming said dispersion into a particulate solid, for instance by water removal and extrusion into a cold solvent bath, wherein the acid and acid buffering agent are dispersed in the matrix forming ingredient. The present invention also relates to encapsulated acid products prepared by said process.

7 Claims, No Drawings

PROCESS FOR ENCAPSULATING LIQUID ACIDS AND PRODUCT

The present invention relates broadly to a process for the preparation of encapsulated liquid acids, and to products obtained by such process.

The present invention is particularly applicable to the encapsulation of acids or acid radicals which are hygroscopic and thus normally marketed in the form of a water solution, and will be described with reference to the preparation of encapsulated phosphoric acid, although it will be apparent to those skilled in the art that the present invention also has application to the encapsulation of water soluble acids which are non-hygroscopic but normally in liquid form, such as formic acid and acetic acid. The present invention is primarily concerned with the encapsulation of weak acids.

BACKGROUND OF THE PRESENT INVENTION

The list of weak acids which are normally liquid, or marketed in the form of a water solution, is not large. Included are phosphoric acid, acetic acid, lactic acid and formic acid. Because of the nature of many of the applications or uses for these acids, it would be highly desirable or advantageous if they could be marketed in solid form. However, up to the present time, encapsulated liquid acids have not been commercially available. One reason is believed to be that the acids tend to attack most matrices which are available as encapsulating agents.

The Zoller et al U.S. Pat. No. 4,082,677 describes a process for making a dry phosphoric acid composition in which a phosphoric acid solution of 75% or 85% concentration is absorbed onto a carrier such as peanut hulls, rice hulls and beet pulp, and then subjected to drying. This is said to form a powdery product with a burnt or charcoal-like appearance. The process and product disclosed in this patent are remote from the present invention. The product is said to be very hygroscopic, as would be expected. Carriers such as those disclosed are not suitable as encapsulating agents using conventional encapsulating procedures.

The process of the present invention is preferably one of extrusion, as disclosed in Beck U.S. Pat. No. 3,704,137, dated Nov. 28, 1972, assigned to assignee of the present application. The disclosure of this patent is incorporated by reference herein. Briefly, it defines a process for making relatively stable, particulate, essential oil-rich compositions. In the commercial practice of this prior invention, a melt of sucrose and hydrolyzed cereal solids having a selective, restricted dextrose equivalent, is mixed with an essential oil to form an emulsion. The melt is then extruded into cool, aggitated isopropanol to produce solidified, saccharated particulates entrapping the oil inside them while washing off exposed oil. After drying, the product particulates are usually coated with an anti-caking agent. The particulates have many uses. A few, such as for use in flavoring and/or odorizing beverage powders, pastries, and other ultimate products, are listed in the patent.

A similar procedure is disclosed in Swisher U.S. Pat. No. 3,041,180.

In the Beck extrusion process, the blend of sucrose with hydrolyzed cereal solids is necessary since sugar alone has insufficient oil retention capability. Also, sugar at melt temperature necessary for extrusion starts to invert and can produce a sticky, hygroscopic product. This limits the amount of cook that can be applied to the composition prior to extrusion. Hydrolyzed cereal solids alone have no crystalline structure and simply would extrude to a fine powder rather than to an oil-retaining matrix.

In co-pending U.S. patent application Ser. No. 692,486, filed Jan. 18, 1985, assigned to assignee of the present application, there is disclosed an improvement in the aforementioned process of Beck for obtaining increased loadings in extruded encapsulates. This process comprises forming the matrix composition of a starch hydrolyzate (e.g., maltodextrin) in combination with a modified starch which is a derivative of waxy maize. A preferred modified starch is identified as hydrogen, octenylbutanedioate amylodextrin. It has a Chemical Abstract Registry No. 61932-62-5. This material is commercially available from National Starch and Chemical Corp. under the trademart "Capsul". "Capsul" has a known use as an encapsulating agent in spray drying techniques, but has not been used in an extrusion process similar to the one in co-pending U.S. patent application Ser. No. 692,486.

The disclosure of this application is also incorporated by reference herein.

In another copending application, U.S. patent application Ser. No. 403,966, (now abandoned) filed Aug. 2, 1982 and refiled on May 3, 1985 as continuation application U.S. patent application Ser. No. 730,756, also assigned to assignee of the present application, there is disclosed the combination of a hydrolyzed atarch with a slightly water-soluble or slowly water-soluble inorganic salt (in place of all or part of the sucrose) to produce an extruded delayed release encapsulate. An advantage of the invention disclosed in the '756 application is the ability to prepare a product which is sugar-free or low sugar and yet has the attributes of a conventional sugar containing matrix.

Examples of preferred salts are dicalcium phosphate, tricalcium phosphate and sodium hexametaphosphate. In this application, it is theorized that the hydrolyzed starch in the particle matrix, being readily water soluble, allows water to attack the integrity of the particles, to initiate release of an active ingredient, whereas the presence of the less soluble or slowly soluble inorganic salt tends to preserve such integrity a sufficient degree to prolong release.

Prior to U.S. Pat. No. 4,232,047, Sair et al, describes the preparation of a glasseous extrudate to stabilize essential oils from deterioration and loss during storage. In Example 9, the encapsulating agent is Capsul brand dextrin. Liquid acids are not mentioned in the patent.

In European patent application Publication No. 0070719 to Johnson, published Jan. 26, 1983, Capsul is disclosed as a preferred carrier for spray dried encapsulation of volatile liquids. Liquid acids are not mentioned in this publication either.

BRIEF STATEMENT OF THE INVENTION

The present invention resides broadly in a process for encapsulating liquid acids which comprises the steps of preparing a water dispersion which contains water, at least one water dispersible film forming matrix ingredient, a liquid acid, and an acid buffering agent in an amount effective to buffer said dispersion; forming said dispersion, under conditions effective for water removal, into a particulate solid in which said acid and acid buffering agent are dispersed in said matrix ingredient; the amount of matrix ingredient being an effective amount to encapsulate said acid and acid buffering agent following water removal.

In a preferred embodiment, the matrix ingredient is subjected to hardening to a glasseous hardened state by contacting said particulate solid with a wash bath at a temperature effective to solidify the particulate and remove excess acid from the surface of said particulate.

In a preferred embodiment for the preparation of phosphoric acid, the process of the present invention comprises the steps of (a) preparing said dispersion with up to about 45% by weight monocalcium phosphate monohydrate, the monocalcium phosphate monohydrate in water disproportionating to a mixture of phosphoric acid and dicalcium phosphate; (b) reducing the water content of said dispersion to less than about 10%; and (c) extruding said dispersion under acid encapsulating conditions, into a cold alcohol bath at a temperature effective to solidify said matrix ingredient and effect removal of excess acid from the surface of the matrix ingredient.

Alternatively, encapsulation of phosphoric acid may be carried out by adding directly to the water dispersion phosphoric acid in an amount up to about 45%, along with a buffering agent such as dicalcium phosphate, in an amount effective to achieve a pH in the dispersion in the range of about 4.4 to about 8.8. This is followed by water removal to a moisture content of less than about 10% and then extrusion into a cold alcohol bath to solidify the matrix ingredient.

DETAILED DESCRIPTION AND SPECIFIC EXAMPLES

All percentages given herein are weight percentages unless otherwise noted.

ACIDS

For purposes of the present invention, the term "liquid acid" means (a) those acids which are normally liquid at normal room temperature, and also soluble in water, such as formic acid (HCOOH) and acetic acid ($CH_3COOH$), having melting points of 8° C. and 17° C., respectively; and (b) those acids or acid radicals which are very hygroscopic and thus normally marketed as a water solution, such as phosphoric acid and lactic acid.

The terms "strong" and "weak" are defined herein according to common usage. Generally, an acid which is completely ionized in water, or has a primary dissociation constant ($K_1$) too high to measure, is considered a strong acid. The remaining acids may be considered weak acids.

Examples of normally liquid weak acids are phosphoric acid, acetic acid, lactic acid and formic acid.

Phosphoric acid is known to exist in about four different states; meta, pyro, ortho and tetra; the different states varying only in the relative amounts of the pentoxide and water present. Phosphorous pentoxide ($P_2O_5$) has a strong tendency to react with water and is a strong drying reagent. If dehydrated to a dry state, it is highly unstable, quickly reverting to a liquid state.

Phosphoric acid is a tribasic acid in which the first hydrogen only is strongly ionizing ($K_1 = 7.1 \times 10^{-3}$), the second being moderately weak ($K_2 = 6.3 \times 10^{-8}$), and the third very weak ($K_3 = 4.4 \times 10^{-13}$).

Phosphoric acid is conventionally marketed in a concentration of about 75-88%, a 75% solution having a phosphorous content of 23.7% by weight, an 85% solution having a phosphorous content of about 26.8% by weight.

Acetic acid is a carboxylic acid having a melting point of 17° C., so that it is conventionally marketed in a liquid state. It is a colorless, water-like acid. At atmospheric boiling point, acetic acid dehydrates to give traces of acetic anhydride. It has a dissociation constant (K) of about $1.8 \times 10^{-5}$.

Formic acid is also a normally liquid carboxylic acid, having a melting point of about 8° C. It boils at about 101° C. It is considered highly toxic and hazardous, and must be handled with the same care as concentrated sulphuric acid. However, it is considered a weak acid, having a dissociation constant of about $2.1 \times 10^{-4}$. Preparation of formic acid in an encapsulated solid state has obvious advantages.

Primary uses for lactic acid (m.p. 16.8° C.) are in foodstuffs and pharmaceutical products. Lactic acid occurs naturally in many food ingredients, and is completely non-toxic and classified safe as a general-purpose food additive. The commercial form is generally a water-soluble, colorless liquid at ordinary room temperature. The dissociation constant (K) for lactic acid is about $1.38 \times 10^{-4}$.

MATRIX INGREDIENTS

A critical matrix-forming ingredient of the present invention is a water-soluble, film-forming composition or combination of such compositions used in the spray drying or encapsulation art. The ingredients should be both water soluble and film-forming, i.e., capable of forming an encapsulating film around the liquid droplets under extrusion or spray drying conditions. Examples of water-soluble, film-forming agents are non-protein base materials such as modified starches, (e.g., starch ethers and esters, and enzyme-treated starches); natural gums (e.g., gum acacia, gum arabic, locust bean gum); water-soluble cellulose compounds (e.g., hydroxymethylcellulose or carboxymethylcellulose); polysaccharides; proteins such as casein, gelatin, soy protein and gluten; and sythetic film-forming agents such as polyvinyl alcohol, polyvinyl pyrolidone, carboxylated styrene).

A preferred film-forming ingredient that can be employed in the practice of the present invention is a modified starch which is a derivative of waxy maize, such as disclosed in copending U.S. patent application Ser. No. 692,486, referred to above. An example of such a starch is hydrogen octenylbutanedioate amylodextrin. This composition has a Chemical Abstract Registry No. 61932-62-5, and is commercially available from National Starch and Chemical Corp. under the trademark "Capsul", and from American Maize Products Co. under the trademark "Amaizo ARD 2326". The role of the modified starch is, primarily, utilization of its film forming characteristics to absorb the acid and buffer into the matrix and hold it there.

Another film forming ingredient that can be employed is a condensation polymer of monosaccharides, or a polysaccharide, such as disclosed in copending application Ser. No. 730,376, filed May 3, 1985, also assigned to assignee of the present application. The disclosure of this application is also incorporated by reference herein. An example of such a polysaccharide is one marketed by Pfizer, Inc. under the name polydextrose. This compound is a randomly bonded condensation polymer of dextrose containing minor amounts of bound sorbitol in citric acid. It is assigned Chemical Abstract Registry No. 68424-04-4, and is described in the publication "Chemistry of Foods and Beverages:

Recent Developments", copyright 1982, Academic Press Inc., in the chapter entitled "The Functional Applications of Polydextrose". The polydextrose can be a sole matrix forming ingredient, or it can be employed with other matrix forming ingredients, for instance the aforementioned octenylbutanedioate amylodextrin.

Examples of natural gums which can be used are gum arabic, tragacanth gum, gum acacia, locust bean gum, destrins, agar agar, algin, carboxymethylcellulose and methylcellulose. These materials, preferably, are employed in amounts less than amount 20% of the matrix, preferably in combination with other matrix forming ingredients. The gums have emulsifying capabilities which may aid in the entrapment of the acids, and can also contribute good film forming characteristics.

The amount of gum employed is generally limited by economics, a large amount adversely affecting extrusion energy requirements, by way of example. The amount of film forming ingredient employed is a film forming amount, preferably about 25–40% of the total dispersion weight, dry basis, more preferably about 30–35% by weight. The amount of acid in the dispersion can be up to about 45%, and preferably is that amount to obtain, in the final product, an acid content of at least about 20%. In this regard, an approximately 75% recovery of acid radical in the final product can be expected. Thus, to obtain a product having about 22% acid, the dispersion initially will contain about 30% acid, dry weight basis. The upper limit of acid in the final product should not be substantially greater than about 35%. This requires an acid concentration in the dispersion of about 45%. The amount of buffer used normally will be less than about 10%.

The film forming ingredient, such as the modified starch, or a gum, when used to prepare the initial water dispersion, tends to increase the viscosity of the dispersion prior to extrusion or spray drying, so that, preferably, a highly water soluble bulking ingredient such as a hydrolyzed starch is also employed in the matrix composition in combination with the film forming ingredient. Such bulking ingredient may be used in an amount to make up essentially the balance of the composition, e.g., up to about 50%, but usually will be about one third of the composition, or in the range of about 20–40%.

The use of a hydrolyzed starch as part of the matrix composition in combination with a modified starch, is also effective in producing a product with a hard, glasseous texture, as disclosed in copending U.S. patent application Ser. No. 692,486.

A preferred hydrolyzed starch is one having a low DE in the range of about 3–20, such as maltodextrin. Maltodextrin is identified by Chemical Abstract Registry No. 9050-36-6. One function of the maltodextrin is also to control texture, a large amount of maltodextrin producing a softer particle, a smaller amount producing a harder particle. Its presence in an encapsulated acid composition is desirable since it is highly water soluble and, when the particles of the present invention are dispersed in a water medium, the maltodextrin allows the water to attack the integrity of the particle to initiate release of the acid.

It is also possible to employ in the matrix composition of the present invention a polyhydric alcohol such as sorbitol or manitol. Sorbitol is marketed as a fine grade powder similar to maltodextrin and functions in the product and process of the present invention similar to maltodextrin. It is highly water soluble and coacts with other matrix forming ingredients to physically trap the acid.

While some sugars, such as sucrose, a disaccharide, can be used, preferably they are used in minor proportion, because the acids tend to cause sugars to invert, making a product which is hygroscopic, tending to be sticky and having limited shelf stability.

It is also possible to use a number of salts to provide a fused or glassy or hard appearance in the end product, such as disclosed in copending patent application Ser. No. 730,756, filed May 3, 1985, also assigned to assignee of the present application, and incorporated by reference herein. These salts are highly water soluble and are the alkali metal or calcium salts of phosphoric acid, citric acid, tartaric acid, carbonic acid, or hydrates thereof. The function of the salt is to substitute for sugar in the basic "Beck" process providing a fused or glassy hard appearance or texture of the particle, and a delayed or controlled release. Here, again, the salts can be employed in combination with the other matrix forming ingredients, for instance in combination with Capsul and/or maltodextrin. In this regard, the matrix formulations of Ser. No. 730,756 are applicable in the present instance. For instance, one of the above mentioned salts can comprise up to about 65% of the matrix composition.

Preferably, the alkali metal or calcium salt employed in the practice of the present invention is neither highly basic nor highly acidic. Specific suitable salts useful in the present invention are listed in the following Table 1:

TABLE 1

| COMPOUND | FORMULA | pH | SOLUBILITY |
|---|---|---|---|
| Sodium hexametaphosphate | $(NaPO_3)_n\ NH_2O$ | 7 | soluble, but dissolves slowly |
| Dicalcium phosphate | $CaHPO_4$ | 7.5 | sparingly soluble |
| Tricalcium phosphate | $3Ca_3(PO_4)_2\ Ca(OH)_2$ | | sparingly soluble |
| Sodium ammonium phosphate | $NaNH_4HPO_4$ | 7.8–8.2 | 1 gram in 5 grams water |
| Sodium tripolyphosphate | $Na_5O_{10}P_3$ | — | 1 gram in 5 grams of water |
| Monopotassium phosphate | $K\ H_2PO_4$ | 4.4 | 1 gram in 5 grams of water |
| Trisodium phosphate | $Na_3PO_4$ | 11.8 | 13 grams in 100 grams water |
| Calcium citrate | — | — | sparingly soluble |
| Calcium tartrate | $C_4H_4CaO_6$ | | sparingly soluble |
| Calcium carbonate | $CaCO_3$ | | sparingly soluble |
| Ammonium carbonate | $(NH_4)_2\ CO_3$ | | slowly soluble in water |

All of the above compounds are insoluble or substantially insoluble in alcohol. Preferred compounds are sodium hexametaphosphate, dicalcium phosphate, and tricalcium phosphate; these compounds being nearly neutral in solution and either sparingly soluble or slowly insoluble in water.

The solubility data in all of the above is for cold water. Water solubility here means the capability of dissolving in water at room temperature to form a solution of at least about 1 gram/per 100 grams of water at ambient temperature, a solubility of about 20 grams/100 grams of water.

The amount of matrix composition which is employed is a matrix forming amount, and will depend upon the amount of acid loading desired and acid encapsulated. It preferably will be employed in an amount less than amount 80% by weight (dry weight), but preferably less than about 70% by weight, based on the dry weight of the dispersed ingredients, the balance being acid and buffer.

BUFFER

The buffering agent may be any one of a large amount of common buffering agents useful in the chemical arts which are effective over a pH range of about 4.4 to about 8.8. Illustrative are alkali metal and ammonium salts of phosphoric acid and hydroxy carboxylic acids such as acetic, citric, lactic, tartaric, adipic and malic acid. A list of food-approved buffers appears in the Third Edition of the Food Chemicals Codex under the heading "Buffers, Neutralizing Agents". Preferred buffers are salts of the acid being encapsulated. For instance, a preferred buffer for lactic acid is an orthophosphate which in solution provides a pH in the range of about 4.4 to about 8.8. Many of the salts in the above Table 1 will function as a buffer in the present invention. Excluded is trisodium phosphate which, in solution, has too high a pH. The buffering agent should be at least sparingly water soluble. The different in use is one of the salts of Table 1 as a buffer vs a matrix forming ingredient is in the amount employed. A buffering amount is that necessary to establish a pH of about 4.4–8.8; which is substantially less, usually less than amount 10%, as mentioned, than if the salt were also employed as a matrix forming ingredient. In the latter instance, the salt, if employed in a matrix forming amount, would also inherently buffer the present composition.

PROCEDURE

The method of preparing the encapsulates of the present invention is analogous to the extrusion procedure in U.S. Pat. No. 3,704,137 to Beck; or alternatively, can employ spray drying.

In the extrusion procedure, a tank is provided, having heating and agitating means, to effect the steps of mixing and cooking. Initially, the matrix ingredients (acid, buffer, water and any other ingredients such as an antifoaming agent, if desired), are charged into the tank, and the mass is stirred and subjected to heating and cooking, under a vaccuum effective to remove water, until the concentration of the mixture reaches, by way of example, about 10% water. Preferably, the acid, if added as such, is added in as concentrated a solution as available.

In the above procedure, the amount of water used initially is a solubilizing amount, sufficient to solubilize or disperse the matrix ingredients. During the boiling, the amount is reduced to about 3–12%, for instance about 10%, depending in part upon proportions of ingredients and viscosity desired (for the subsequent extrusion or spray drying step).

The cooking tank is provided with an extrusion cap or spinneret, isolated from the tank by a valve. Opening the valve allows the tank contents to move under pressure through the extrusion cap or spinneret into a basket carried in a shallow tray of cold solvent for the acid. The extruder has a head provided with a large number of about 1/64 inch diameter orifices through which the combined mix is forced under 20 to 150 psig air pressure. The cold solvent serves two purposes; to remove excess acid from the surface of the extrudate, and to effect solidification of the extruded melt (an example of a solvent temperature effective to solidify the extrudate is about −10° C.). In the tray, the extruded rods can be subjected to agitation and comminution to wash off the excess acid and also to break up the rods into desired lengths. From the tray, the broken-up rods are separated from a major portion of the liquid solvent by a settling or draining action, and the broken-up rods are then charged into a centrifuge to remove most of the liquid solvent, the solvent being discharged from the centrifuge into a solvent tank.

The particulate, rod-like solids from the centrifuge are discharged into a mixer, into which is also charged an anticaking agent. The preferred anti-caking agent is siliceous material, preferably pyrogenic silica, of a particle size comparable to that desired in the final composition.

The finished product contains an amount of acid up to about 35% by weight of the finished product. The product has good keeping properties in that it will not crystallize upon long standing, nor is it subject to substantial deterioration. The use of about 0.5% by weight of the final composition of pyrogenic silica powder effectively prevents the rod-like particles of the composition from sticking together upon long standing in a packaged condition and, also, of course, facilitates the transfer of the composition from the packages to the points of actual use of the composition.

In an alternative to the above procedure, instead of adding acid as such directly to the cook in the mixing and cooking step, a source of phosphoric acid which disproportionates into acid and salt in a water solution can be added. Monocalcium phosphate dissolves in water and disproportionates to a phosphate and phosphoric acid. This conversion is disclosed in detail in Kirk-Othmer "Encyclopedia of Chemical Technology", Vol. 17, page 445 (Wiley Interscience, New York, 3rd Ed., 1982). This disclosure is incorporated by reference herein.

With the use of monocalcium phosphate, the reaction can be exemplified as follows:

$$Ca(H_2PO_4)_2 \cdot H_2O + x\, H_2O = Ca\, HPO_4 + (x+1) H_2O$$

An advantage in disproportionation is that the buffering function is achieved in-situ. In addition, in-situ conversion to acid and buffer, by disproportionation, results in a product having an attractive off-white, tan color, rather than a burnt charcoal-like or darker appearance characteristic of the process of prior U.S. Pat. No. 4,082,677 (Zoller et al), or direct addition of acid.

A further alternative procedure involves spray drying a water dispersion of the matrix ingredient and acid, formed either by direct addition of acid or by disproportionation of a salt such as monocalcium phosphate, using generally conventional spray drying procedures. A dispersion containing water, matrix forming ingredient, acid and buffer is initially prepared, as in the case of extrusion, following conventional spray drying criteria. Reduction of water content or drying takes place in the spraying step.

The following examples are illustrative of the mode of making the compositions of this invention. All temperatures are in degrees Fahrenheit and all percents are by weight unless otherwise stated.

EXAMPLE 1

This Example illustrates the fixation of phosphoric acid in a carbohydrate matrix following the procedure disclosed in prior Beck U.S. Pat. No. 3,704,137. Phosphoric acid is used in cheeses and brewing to adjust pH. It is also used in soft drinks, preservation of animal feed, an ingredient in bread dough, and as a yeast stimulant. Obviously, a dry phosphoric acid would be advantageous from an ease-of-use standpoint.

The following formulation was prepared:

| Ingredient | Percent | Weight Grams |
|---|---|---|
| Maltodextrin "M-100", (TM) Grain Processing Corp. | 39.5 | 895.9 |
| Food starch, modified, "Capsul" (TM) | 30.0 | 680.4 |
| Monocalcium phosphate, monohydrate | 30.0 | 680.4 |
| Lecithin, "Centrophase HR" Central Soya | 0.5 | 11.3 |
| Water | | 1500 mls |
| | 100.0 | |

The 1500 mls of water was necessary to dissolve or disperse the dry ingredients. A cook vessel was charged initially with the water and lecithin under agitation, to disperse the lecithin. This was followed by addition to the vessel of the starch, maltodextrin and monocalcium phosphate, still under agitation until the mix was homogeneous. The lecithin was added as an anti-foaming agent. Normally, no emulsifier or viscosity controlling agent is required since the acid or acid forming component can be added prior to cook rather than after cook to the melt, as is required for encapsulation of low boiling point flavors and essential oils.

At this point, the vessel was heated to 200° F. using steam pressure at 20 psi, and the cook was carried out for one hour and 55 minutes under 580 mm Hg vacuum until about 1350 mls of water were removed. This provided a slightly viscous melt having a water content less than about 10%.

The melt was then forced through a spinneret extruder, using 30 psi nitrogen, into an isopropanol bath at −10° C. This caused the thin extruded strands (about ⅛ mm in diameter) to solidify into rods. In the bath, the rods were washed free of surface acid and then comminuted into a particulate form. The resulting particulate was then dried in a centrifuge to practical dryness.

Processing is completed by charging the cleansed particulates into a mixer, where they are coated with an anticaking agent, e.g., pyrogenic silica or any of the other known anticaking agents, e.g., talc, calcium carbonate, using 2 parts of anticaking agent per hundred parts of the particles. The particles are then screened in a screener to separate oversize and undersize material and excess anticaking agent.

The product of this Example had a percent acid content (encapsulated) of 22.14% (average of three samples), for about a 75% recovery. The product was nonhygroscopic and showed no evidence of residual exposed acid. The capsules had a hard glasseous structure which completely protected the phosphoric acid from exposure to moisture. Handling properties for the product were excellent.

The color of the product was a pleasant off-white to light tan.

EXAMPLE 2

In this Example, phosphoric acid was added directly to a dispersion containing dicalcium phosphate buffering agent. The formula was as follows:

| Ingredient | Percent Weight |
|---|---|
| Maltodextrin | 41.5 |
| Starch, modified, "Capsul" | 35.0 |
| Phosphoric acid, 85% | 20.0 |
| Dicalcium phosphate, FCC grade | 3.0 |
| Lecithin | .5 |
| | 100.0 |

Processing was carried out following the procedure of Example 1, using the following conditions:
$H_2O$ added: 1000 mls
$H_2O$ removed: 930 mls
Vacuum: 12.5 inches Hg
Cook temperature: 240° F.
Extrusion temp.: 240° F.
Extrusion pres.: 20psi The product extruded as glassy strands, which were brown in color. After solidification in isopropyl alcohol, the rods were observed to be functional.

Dicalcium phosphate in solution (1%) gives a pH of about 7.5. It is sparingly soluble in water.

EXAMPLES 3-6

In these Examples, phosphoric acid was added directly to a series of dispersions containing different buffering agents. The buffering agents were:

| Example | Buffer | pH (in 1% solution) | Solubility (in g/100 g) |
|---|---|---|---|
| 3 | sodium aluminum phosphate (SALP) | 2.6 | slight |
| 4 | trisodium phosphate (TSP) | 11.8 | 13 |
| 5 | disodium phosphate (DSP) | 8.8 | 11 |
| 6 | monopotassium phosphate (MPP) | 4.4 | 20 |

The formula used was:
Maltodextrin (DE 10-15): 34.5
Starch, modified "Capsul": 30.0
Phosphoric acid, 85%: 25.0
Buffer: 8.0
Anti-foaming agent: 2.5

The following Table gives buffer used, and certain processing conditions. In all instances, the anti-foaming agent was a polyglycerol ester of a fatty acid marketed by Stokely-Van Camp under the trademark Caprol 10G20. It is essentially a decaglycerol dioleate. The vacuum employed during cook was 12.5 inches mercury, and cook temperature was 240° F. The water added to make up the initial dispersion in all instances was 800 mls.

TABLE 2

| Example | Buffer | H₂O Removed | Extrusion Temp. | Extrusion Pres. N₂ |
|---|---|---|---|---|
| 3 | Sodium aluminum phosphate | 740 mls | 230–240° F. | 40 psi |
| 4 | Trisodium phosphate | 700 mls | 230–235° F. | 20 psi |
| 5 | Disodium phosphate | 750 mls | 230° F. | 20 psi |
| 6 | Monopotassium phosphate FCC grade | 750 mls | 220° F. | 20–40 psi |

The following results were obtained:

TABLE 3

| | |
|---|---|
| Ex. 3 SALP | No strands during extrusion, product would not solidify in isopropyl alcohol. Non functional. |
| Ex. 4 TSP | No strands during extrusion. Non-functional. |
| Ex. 5 DSP | Brown strands during extrusion. Rods observed in IPA. |
| Ex. 6 MPP | Brown strands during extrusion. Rods observed in IPA. |

Based on the functionality of DCP (pH 7.5), MPP (pH 4.4), and DSP (pH 8.8) and the non-functionality of SALP (pH 2.6) and TSP (pH 11.8), the pH of solution of the buffer ingredient is preferably between pH 4.4 and pH 8.8. It is presumed that all other ortho-phosphates within this pH range will be functional as a barrier to prevent the phosphoric acid from dissolving the coating material.

I claim:

1. A process for encapsulating liquid acids comprising the steps of
    (a) preparing a water dispersion comprising water, at least one water dispersible matrix forming ingredient including a film forming amount of a film forming agent which on hardening forms a glasseous structure, a liquid acid and an acid buffering agent present in an amount effective to establish a pH of said dispersion in the range of about 4.4 to about 8.8;
    (b) forming said water dispersion into a hot aqueous cook and carrying out the heat of said cook until a water content of less than amount 10% is obtained;
    (c) extruding the dispersion of step (b) into a cold alcohol bath at a temperature effective for solidifying the matrix composition;
    (d) the amount of matrix forming ingredient being an effective amount to encapsulate said acid and acid buffering agent, the matrix being free of acid and acid buffering agent on the external surface thereof.

2. The process of claim 1 wherein said film forming agent is hydrogen octenylbutanedioate amylodextrin.

3. The process of claim 1 in which said dispersion comprises an amount of acid effective to obtain an acid content in the particulate solid of at least about 20%.

4. The process of claim 3 wherein said matrix forming ingredient comprises a film forming amount of a modified starch and a bulking amount of a hydrolyzed starch.

5. The process of claim 1 wherein said acid is phosphoric acid.

6. The process of claim 5 wherein said dispersion is prepared by adding to water said matrix forming ingredient and monocalcium phosphate monohydrate which disproportionates in the presence of water to phosphoric acid and dicalcium phosphate.

7. A product prepared by the process of any of the preceeding claims.

* * * * *

UNITED STATES PATENT AND TRADEMARK OFFICE
CERTIFICATE OF CORRECTION

PATENT NO. : 4,713,251
DATED : December 15, 1987
INVENTOR(S) : Jon T. Seighman

It is certified that error appears in the above–identified patent and that said Letters Patent are hereby corrected as shown below:

Column 5, line 9, change "destrins" to -- dextrins --

Column 8, line 50, before "(x + 1)" insert -- $H_3PO_4$ + --

Column 10, below line 23, insert -- Processing Conditions --

Column 12, line 11, change "amount" to -- about -- .

Signed and Sealed this

Fifth Day of July, 1988

Attest:

DONALD J. QUIGG

Attesting Officer

Commissioner of Patents and Trademarks